United States Patent [19]
Anderson

[11] Patent Number: 5,801,298
[45] Date of Patent: Sep. 1, 1998

[54] IN-LINE VALVE SEAT LEAK FLOW TESTING APPARATUS

[75] Inventor: David Charles Anderson, Ponchatoula, La.

[73] Assignee: Shell Oil Company, Houston, Tex.

[21] Appl. No.: 720,846

[22] Filed: Oct. 3, 1996

[51] Int. Cl.[6] .................... G01M 3/00; G01M 3/26
[52] U.S. Cl. .................. 73/49.8; 73/40; 73/40.5 R; 73/46
[58] Field of Search .................... 73/40, 46, 49.8, 73/40.5 R

[56] References Cited

U.S. PATENT DOCUMENTS

| | | | |
|---|---|---|---|
| 3,088,312 | 5/1963 | Morris | 73/49.8 |
| 4,311,038 | 1/1982 | Dunn | 73/49.8 |
| 4,432,227 | 2/1984 | Dunn | 73/49.8 |
| 4,520,655 | 6/1985 | Owens | 73/49.8 X |
| 5,287,730 | 2/1994 | Condon | 73/49.8 |
| 5,528,926 | 6/1996 | Emmitte, Jr. | 73/46 X |

*Primary Examiner*—Hezron E. Williams
*Assistant Examiner*—Daniel S. Larkin

[57] ABSTRACT

A leak check blind, according to the present invention, allows an in-line valve seat to be tested without removal of the valve from the line. The leak check blind is inserted in the flow line upstream from the valve to be tested. The blind is connected to a pressurized fluid supply for injecting a flow (pressure) to the valve and external flow measuring devices are provided for monitoring any flow of the test fluid. Any test fluid flow is indicative of a leaking in-line valve. If the detected leak is outside prescribed limits, the valve is then removed from the line and either repaired or replaced with a new valve. If the leak is within acceptable limits, the valve is simply reconnected and put back in service.

18 Claims, 4 Drawing Sheets

IN-LINE VALVE SEAT LEAK FLOW TESTING APPARATUS

FIELD OF THE INVENTION

The invention is directed to methods and apparatus for testing the seats of in-line valves without the necessity of removing the valve from the line.

BACKGROUND OF RELATED ART

Control valves have, in the past, been checked for leakage by removing the chosen valve from the fluid line, placing it in a laboratory bench test setup in the "closed" position, injecting a test fluid under pressure and monitoring the fluid line downstream of the control valve for any fluid flow. Detection of any fluid flow indicated a leaking valve seat and, if outside acceptable limits, a need for repairing or replacing the valve. This is a very expensive, time-consuming procedure.

SUMMARY OF THE INVENTION

A leak check blind, according to the present invention, allows an in-line valve seat to be tested without removal of the valve from the line. The leak check blind is inserted in the flow line upstream from the valve to be tested. The blind includes means for injecting a flow (pressure) to the valve and external means are provided for monitoring any flow of the test fluid. Any test fluid flow is indicative of a leaking in-line valve. If the detected leak is outside prescribed limits, the valve is then removed from the line and either repaired or replaced with a new valve. If the leak is within acceptable limits, the valve is simply reconnected and put back in service.

DESCRIPTION OF THE PREFERRED EMBODIMENTS

The control valve test blind is used for in-line leak testing of control valve seats without the necessity of valve removal. The blind is thin enough (approximately ½ inch) to be inserted between the control valve inlet and process piping. The seat leak test is performed using a test medium (e.g., clean air or nitrogen) at a pressure of about 50 PSIG applied to the test blind inlet. Leakage flow is measured, and compared to the maximum allowable leakage rate for the valve under test, at the outlet of the control valve. Preferably, a portable cart with regulators, rotometers, and a bubble tester is used to record leakage rates.

The main reason for use of the in-line test blind is to determine internal trim condition (leakage rate) without removal of the valve from the process piping system. Control valve seat leak testing is necessary to assure that maximum allowable leakage rates have not been exceeded. Typical applications are on fuel gas shutdown valves, level dump valves, and any other tight shutoff valves that must have a minimum leakage rate. On valves that do not require tight shutoff, the leak test procedure is used to verify the condition of the plug and seat area associated with valve trim.

Other potential applications are testing of manual gate and globe valves and safe depressuring of piping systems during equipment maintenance.

For simplicity and ease of illustration in the following description, the device under test is referred to simply as a "control valve." The control valve must be isolated from the process either by blocking and depressuring or by a unit-down condition.

Figure 1:
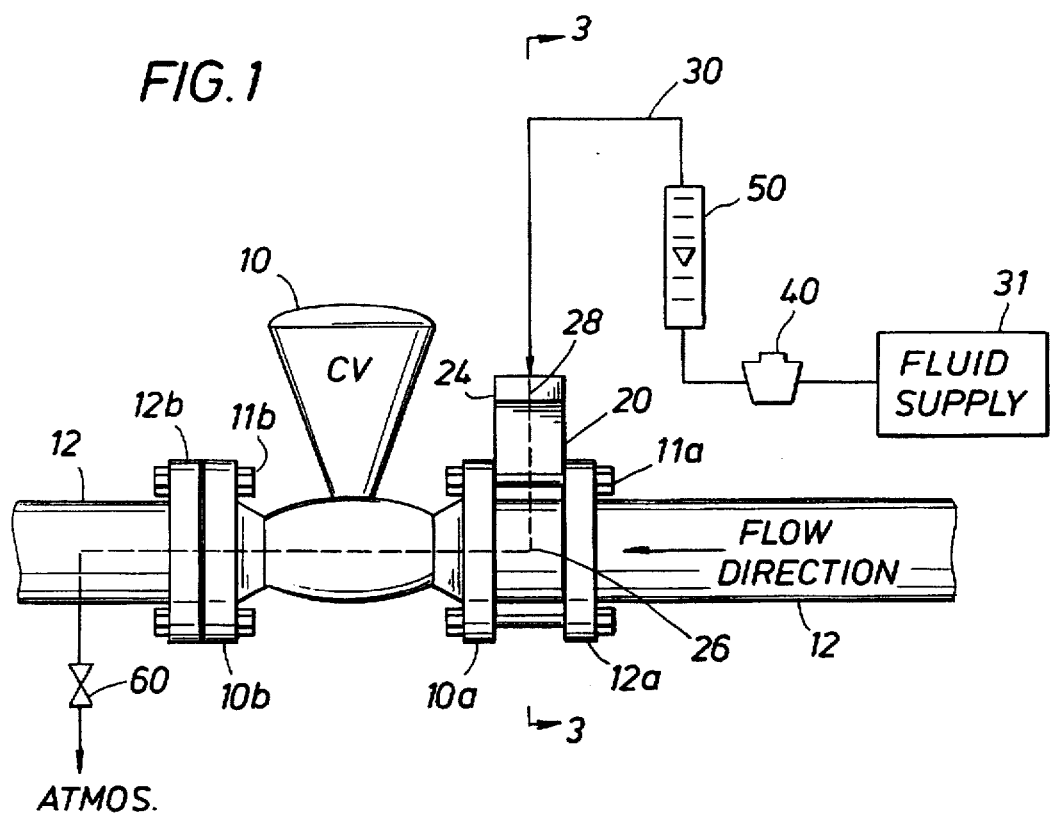
FIG. 1 is a schematic of the test setup with the invention in place.

Referring now to FIG. 1, a control valve 10 having flanges 10a and 10b is shown connected in a process line 12 to process line flanges 12a and 12b, by flange bolts 11a and 11b. Fluid flow direction is as shown by the arrow. The valve flange 10a on the upstream side of the control valve 10 has been disconnected from pipe flange 12a of the process line 12 (by loosening and/or removal of flange bolts 11a) in order that the control valve 10 can be tested for leakage. Prior to the instant invention, in order to test the valve 10 for leakage, removal of flange bolts 11b and disconnection of the flange connections 10b and 12b was also required. The entire control valve 10 would then be removed from the process line 12, taken to a laboratory, inserted in a laboratory process line and tested for leakage. If the amount of leakage was within acceptable limits, the valve would be disconnected from the laboratory test setup and reinstalled in the process line 12. If the leakage rate was unacceptable, the valve 10 would be repaired or replaced by a new valve. The instant invention has simplified this procedure.

In a preferred embodiment, it is not necessary to completely remove all the bolts securing the flanges 10a, 12a. It is only necessary to remove some (not more than half) of the bolts 11a while simply loosening the others. Alternatively, the blind 20, 20a may include a bolt hole pattern to match the corresponding flange or flanges, in which case all bolts must be removed, then replaced when the blind is installed.

After loosening the flange bolts 11a at interface 10a, 12a (and removing one or more of the bolts), a leak check blind 20 according to the preferred embodiment of the instant invention is inserted between the flanges 10a and 12a and the flange bolts 11a retightened. The leak check blind 20, shown more clearly in FIGS. 3 and 4, comprises a plate 22 which interfaces with the flanges 10a, 12a to provide a leak-free connection. Preferably, the diameter of plate 22 is greater than the inside diameter 23 of the process line 12 but is less than the inner diameter of the bolt hole pattern. Thus, the blind plate 22 overlaps the pipe flange 12a face by a small amount, generally ¼ "to ¾" and is sealed by a gasketing material. A handle 24 extends from the plate 22 and external to the process line 12 to provide ease in handling the leak check blind 20. The surface of plate 22 adjacent the flange 12a, i.e., on the upstream side of flow, is solid so as to prevent any flow to or from the upstream side. A standard piping gasket (not shown) is used between flange 10a and the leak check blind 20 to prevent leakage. The downstream side of blind 20 is provided with a passage 26. Connecting with passage 26 and extending through the handle 24 is a second passage 28. Passage 28 is fitted at its exit point from handle 24 with a suitable connection (not shown) for connection with a fluid test line 30. Fluid test line 30 is connected to a suitable fluid source such as test medium supply 31. A regulator 40 is inserted in the line 30 to control fluid flow from the fluid supply 31 and a rotometer 50 monitors and measures fluid flow through line 30.

Figure 2:
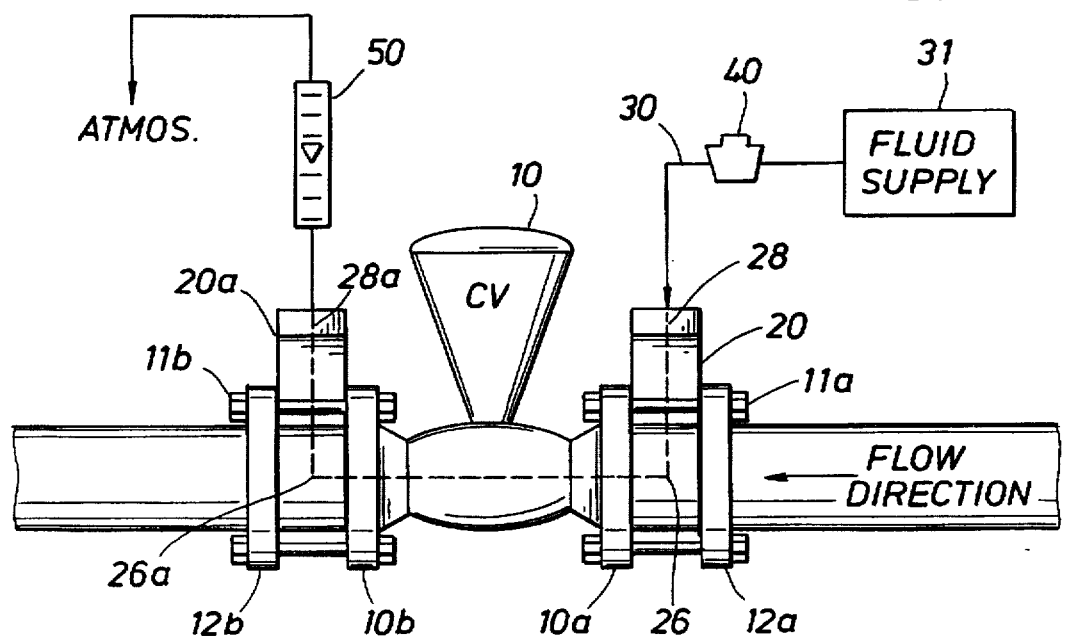
FIG. 2 is a schematic of a test setup for a second embodiment of the invention.

In operation, with the configuration as shown in FIG. 1, fluid flow is initiated in line 30 at prescribed pressures. A bleed valve 60 in the process line 12 has previously been opened downstream of valve 10 and remains open during the test. Then, with control valve 10 closed, the test circuit, comprising regulator 40, rotometer 50, the fluid line 30, blind 20 (passages 26, 28), and control valve 10 is simply pressured up to a regulated test pressure. With the control valve 10 remaining closed, the rotometer 50 is monitored for flow which indicates leakage through valve 10. The valve 10 may be stroked open during the test to indicate or assure a flow increase and that the flow decreases when the valve 10 is closed. If a bleed valve 60 or line bleed off capacity is unavailable, a second leak check blind 20a is installed between flanges 10b and 12b as shown in FIG. 2 and in the same manner as blind 20. The rotometer 50 monitors and measures any flow through the valve 10 during the "open" and "closed" tests of valve 10.

Figure 4:
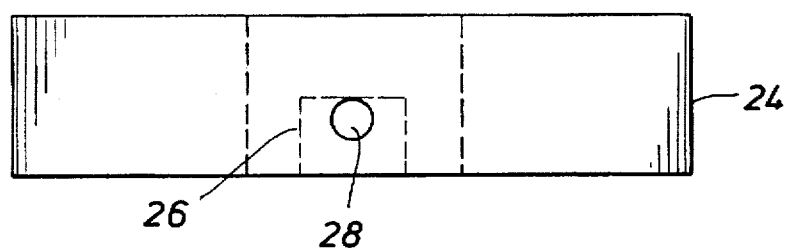
FIG. 4 is a plan view of the blind handle taken along the line 4—4 of FIG. 3.
Figure 3:
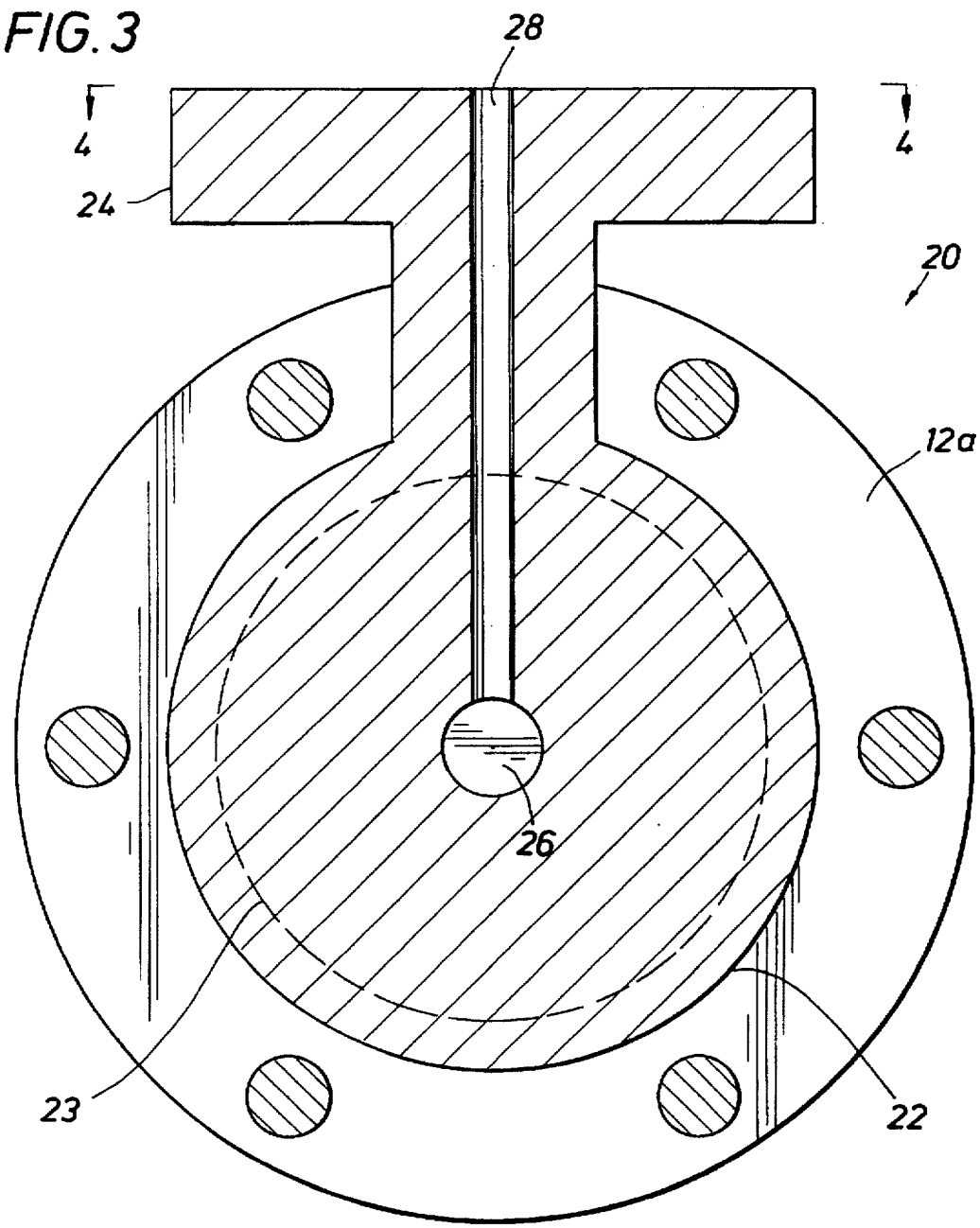
FIG. 3 is a sectional view of the leak check blind taken along the line 3—3 of FIG. 1.

Referring now to FIGS. 3 and 4, the leak check blind 20 (and/or 20a) is shown in a section taken through the center line of passage 28 with the pipe flange 12a shown in phantom. The passages 26 and 28 of blind 20 are in fluid communication with each other and with valve 10 but are not in fluid communication with the upstream side of process line 12. When the configuration of FIG. 2 is required, a second blind 20a is reversed with respect to blind 20 such that the passageways 26, 28 of blind 20 are in fluid communication with the valve 10 and with the passageways 26a, 28a of blind 20a.

Figure 5:
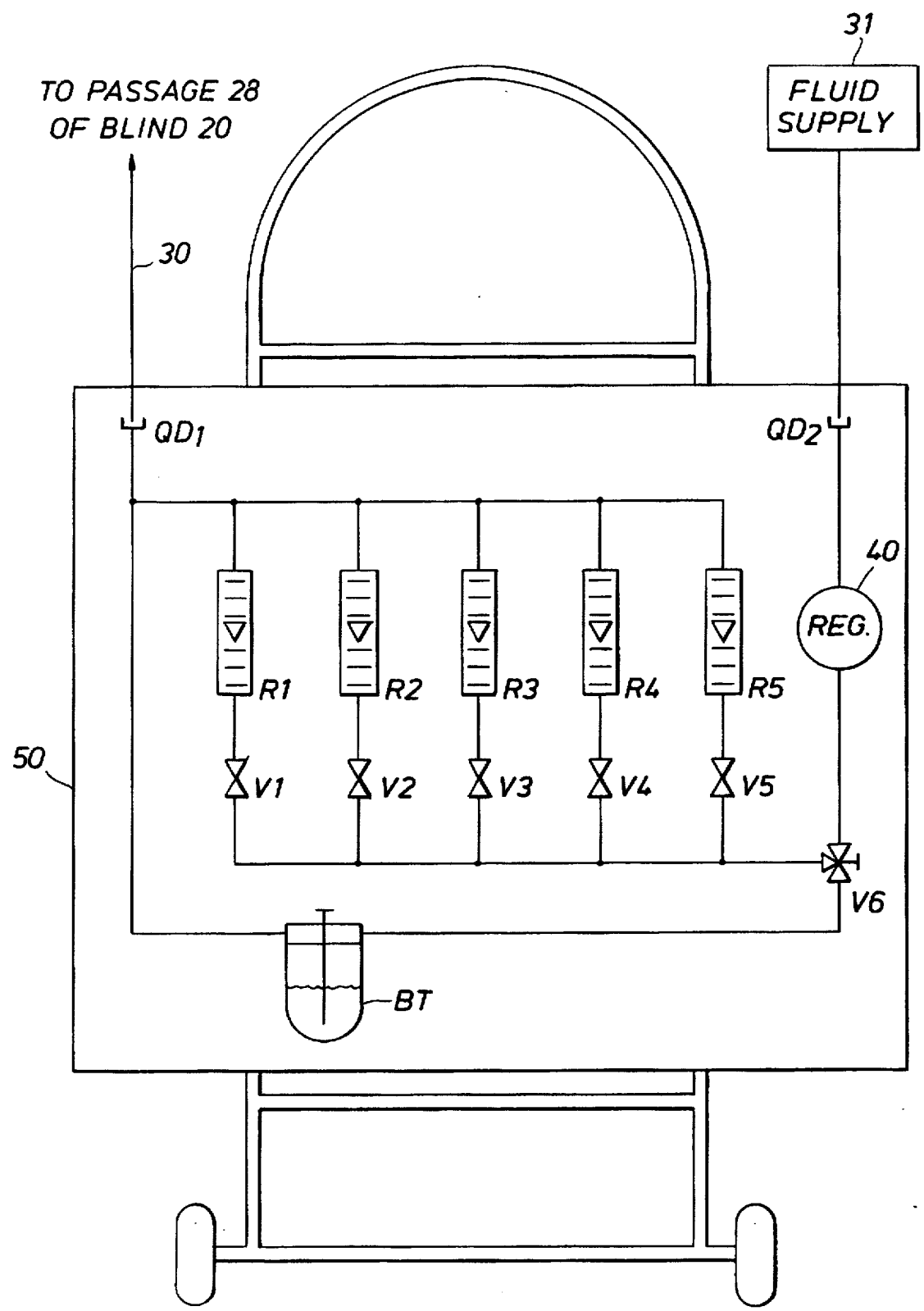
FIG. 5 is a schematic drawing of the portable cart which is used in testing the valve.

The invention is best practiced by using a portable test cart as shown schematically in FIG. 5. The test cart includes a panel having five rotometers $R_1$–$R_5$ (shown as rotometer 50 in FIG. 1) connected in parallel, such that any one rotometer may be connected into line 30 as desired by opening the respective valve $V_1$–$V_5$. Rotometers $R_1$–$R_5$ preferably have different measurement ranges to accommodate various leak rates. Rotometer $R_1$ may, for example, have a range of 0–2 SCFH (standard cubic feet per hour), $R_2$ may have a range of 0–10 SCFH, $R_3$ may have a range of 5–50 SCFH, $R_4$ a range of 25–200 SCFH and $R_5$ a range of 50–500 SCFH. Additionally, a bubble tester BT is included and will be selected (by opening valve $V_6$) instead of one of the rotometers $R_1$–$R_5$ when Class 6 shutoff testing is required as defined by ANSI specifications.

Rotometers $R_1$–$R_5$ and bubble testers BT may be any model of any manufacturer as long as it meets the SCFH requirements.

The test panel includes a first quick disconnect $QD_1$ for connection of line 30 to passage 28 of the test blind 20. A second quick disconnect $QD_2$ allows connection to test medium supply 31, the test fluid. A regulator 40 controls the pressure of the test fluid supplied by test medium 31. A sixth valve $V_6$ allows selection between the rotometer bank $R_1$–$R_5$ and the bubble tester BT.

Figure 6:
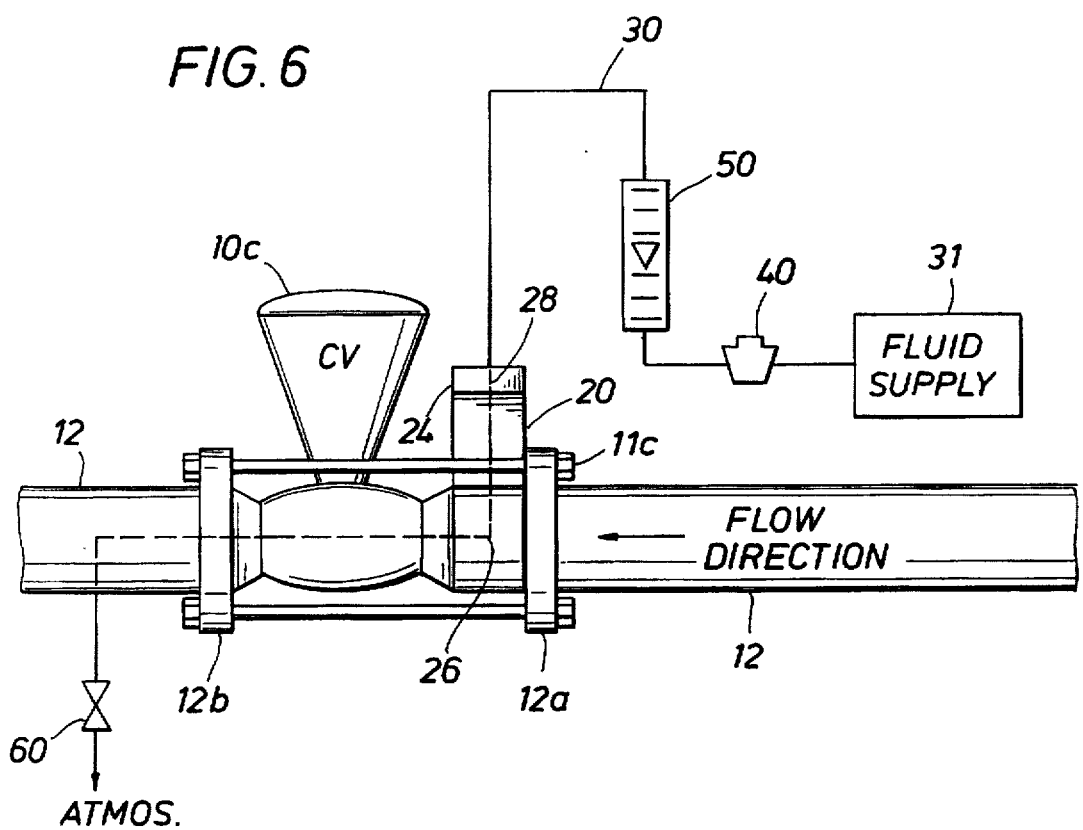
FIG. 6 is a schematic, analogous to FIG. 1, for testing a flangeless valve.

Referring now to FIG. 6, a flangeless control valve 10c is shown. The connection of the flangeless valve 10c of FIG. 6 is similar to the connection shown in FIG. 1 except that the valve 10c has no flanges 10a, 10b as in valve 10 of FIG. 1, and valve 10c is simply clamped between the two pipe flanges 12a, 12b by long bolts 11c. As in the test setup of FIG. 1, gasketing material is inserted to seal the interfaces between flange 12b and valve 10c and between blind 20 and valve 10c.

Figure 7:
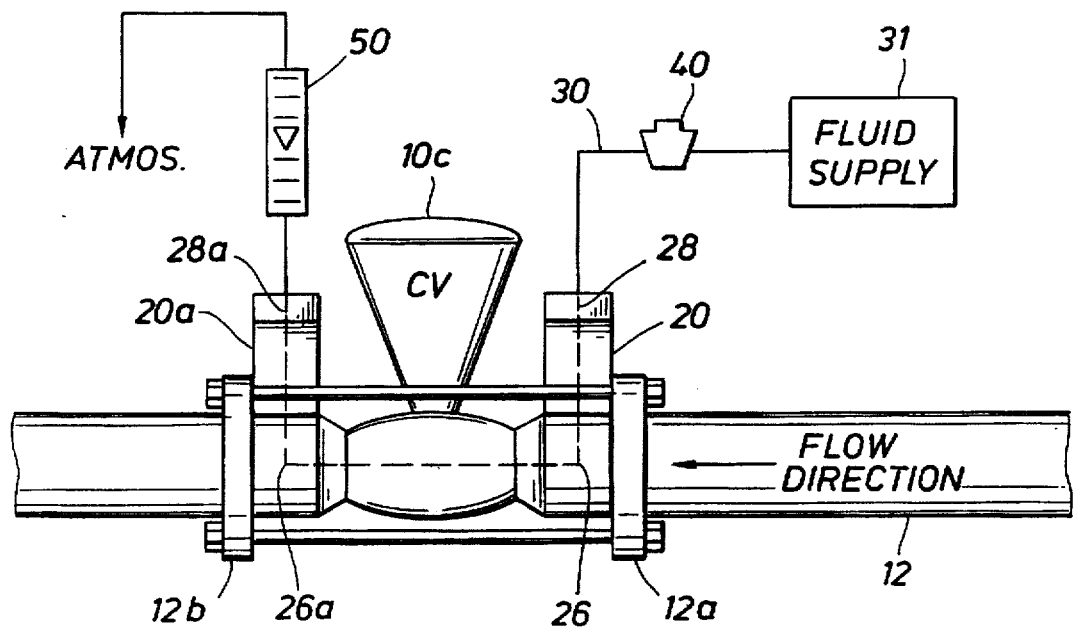
FIG. 7 is a schematic, analogous to FIG. 2, for testing a flangeless valve.

FIG. 7 is analogous to FIG. 2, the difference being that, as in FIG. 6, a flangeless valve is being used. Gasketing material is required between the valve 20c interfaces with blinds 20 and 20a.

When testing flangeless valves, the preferred blind 20 is as shown in FIG. 3, i.e., having no bolt holes. It will be appreciated, however, that a blind 20 having a bolt hole pattern matching the respective flanges may be used.

What is claimed is:

1. A leak check apparatus comprising:

a plate having first and second faces, said plate being adapted to be installed between first and second flanges in a process line, said flanges having matching bolt hole patterns, said first flange being part of a control valve to be tested, said second flange being part of a process line in which said control valve is connected;

wherein said first face of said plate is adapted to abut said second flange and prevent flow of fluid in said process line;

wherein said second face of said plate is adapted to abut said first flange of said control valve;

a first passage in said second face of said plate, said first passage adapted to be in fluid communication with said control valve; and a second passage in fluid communication with said first passage, wherein said second passage is located between said first and second faces of said plate and terminates at a point external to said process line.

2. The apparatus of claim 1 wherein the diameter of said plate is greater than the inside diameter of said process line but is less than the inside diameter of said bolt hole pattern.

3. The apparatus of claim 1 further comprising a handle extending from said plate and being coplanar therewith.

4. The apparatus of claim 3 wherein said second passage extends through said handle.

5. A system for testing a control valve for leakage wherein said control valve has upstream and downstream-facing faces and is located in a fluid process line, comprising:

a plate having first and second faces, said plate being adapted to be installed between two flanges in said process line, said flanges having matching bolt hole patterns, one of said flanges being part of a control valve to be tested, the other of said flanges being part of said process line in which said control valve is connected;

wherein said first face prevents flow of fluid in said process line;

wherein said second face abuts said flange of said upstream face of said control valve;

a first passage in said second face, said first passage being in fluid communication with said control valve;

a second passage in fluid communication with said first passage, wherein said second passage is located between said first and second faces and terminates at a point external to said process line;

a fluid supply line connected to said second passage;

means for supplying fluid pressure to said fluid supply line; and means for measuring fluid flow in said fluid supply line.

6. The system of claim 5 further comprising a second plate located on said downstream face of said control valve.

7. The system of claim 5 wherein the diameter of said plate is greater than the inside diameter of said process line but is less than the inside diameter of said bolt hole pattern.

8. The system of claim 5 further comprising a handle extending from said plate and being coplanar therewith.

9. The system of claim 8 wherein said second passage extends through said handle.

10. A leak check apparatus comprising:

a plate having first and second faces, said plate being adapted to be installed between a flange in a process line, and a face of a control valve to be tested;

wherein said first face is adapted to prevent flow of fluid in said process line;

wherein said second face is adapted to abut said face of said control valve;

a first passage in said second face, said first passage adapted to be in fluid communication with said control valve; and a second passage adapted to be in fluid communication with said first passage, wherein said second passage is located between said first and second faces and is adapted to terminate at a point external to said process line.

11. The apparatus of claim 10 wherein the diameter of said plate is greater than the inside diameter of said process line but is less than the inside diameter of said bolt hole pattern.

12. The apparatus of claim 10 further comprising a handle extending from said plate and being coplanar therewith.

13. The apparatus of claim 12 wherein said second passage extends through said handle.

14. A system for testing a control valve for leakage wherein said control valve has upstream and downstream-facing faces and is located in a fluid process line, comprising:

a plate having first and second faces, said plate being adapted to be installed between a flange in said process line and the upstream face of a control valve to be tested;

wherein said first face prevents flow of fluid in said process line;

wherein said second face abuts said face of said upstream face of said control valve;

a first passage in said second face, said first passage being in fluid communication with said control valve;

a second passage in fluid communication with said first passage, wherein said second passage is located between said first and second faces and terminates at a point external to said process line;

a fluid supply line connected to said second passage;

means for supplying fluid pressure to said fluid supply line; and means for measuring fluid flow in said fluid supply line.

15. The system of claim 14 further comprising a second plate located on said downstream face of said control valve.

16. The system of claim 14 wherein the diameter of said plate is greater than the inside diameter of said process line but is less than the inside diameter of said bolt hole pattern.

17. The system of claim 14 further comprising a handle extending from said plate and being coplanar therewith.

18. The system of claim 17 wherein said second passage extends through said handle.

* * * * *